United States Patent [19]
Yokoshima et al.

[11] Patent Number: 5,102,289
[45] Date of Patent: Apr. 7, 1992

[54] DAMPER DEVICE FOR PRECISION ASSEMBLING ROBOT

[75] Inventors: Norio Yokoshima; Masahide Nagai; Akira Shimada, all of Tokyo, Japan

[73] Assignee: Seiko Instruments Inc., Japan

[21] Appl. No.: 351,762

[22] Filed: May 15, 1989

[30] Foreign Application Priority Data

May 13, 1988 [JP] Japan .......................... 63-62896[U]

[51] Int. Cl.⁵ .................................................. B25J 19/06
[52] U.S. Cl. ................................ 414/744.2; 901/49; 188/379
[58] Field of Search ................ 188/378, 379, 380; 267/136, 137; 901/49; 414/744.1, 744.2, 913, 719

[56] References Cited

U.S. PATENT DOCUMENTS

| | | | |
|---|---|---|---|
| 3,314,503 | 4/1967 | Neubert | 188/379 |
| 4,494,634 | 1/1985 | Kato | 188/380 |
| 4,697,781 | 10/1987 | Hamano et al. | 188/379 X |
| 4,852,848 | 8/1989 | Kucera | 188/379 X |
| 4,873,888 | 10/1989 | Matsuyama | 188/378 X |

FOREIGN PATENT DOCUMENTS

| | | | |
|---|---|---|---|
| 744876 | 2/1944 | Fed. Rep. of Germany | 188/379 |
| 0131658 | 11/1978 | Japan | 188/379 |
| 0136259 | 11/1978 | Japan | 901/29 |
| 0136260 | 11/1978 | Japan | 901/49 |
| 0136261 | 11/1978 | Japan | 188/380 |
| 2165918 | 4/1986 | United Kingdom | 188/379 |

*Primary Examiner*—Robert P. Olszewski
*Assistant Examiner*—William M. Hienz
*Attorney, Agent, or Firm*—Bruce L. Adams; Van C. Wilks

[57] ABSTRACT

A damper device for a precision assembling robot is capable of dampening the residual vibrations of the robot arm resulting from a lack of rigidity of the arm. The damper device is fixed to the tip of the robot arm to absorb the vibration energy of the swinging robot arm. The damper device includes a cylindrical weight member and a columnar rubber member. The damper device further includes a metallic rod inserted in the columnar rubber member. The length and position of the inserted metallic rod controls the dampening factor of the damper device. Therefore, the precision assembling robot with the damper device is capable of preventing a failure of assembly due to positioning errors resulting from residual vibrations, or nonconformities due to the impact of the robot arm against an object.

14 Claims, 3 Drawing Sheets

FIG. 3
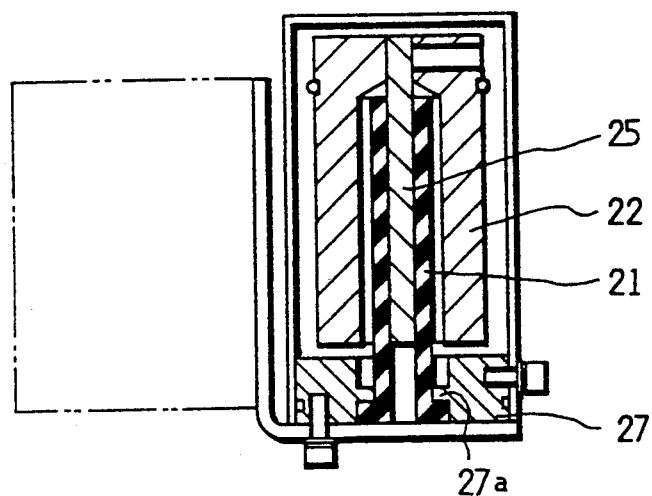
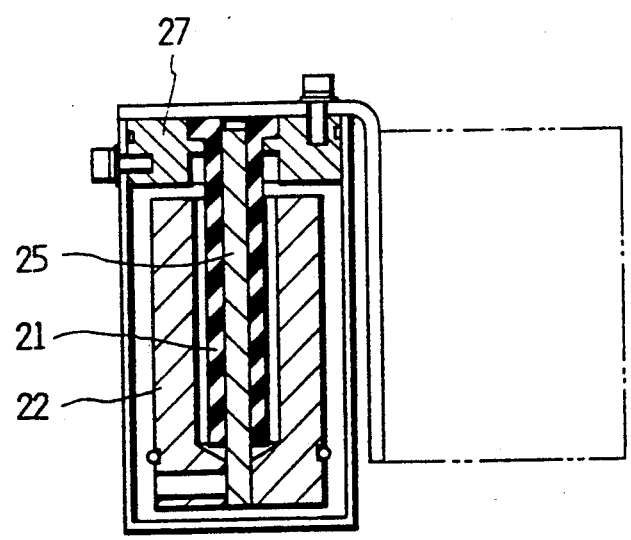
FIG. 4

DAMPER DEVICE FOR PRECISION ASSEMBLING ROBOT

BACKGROUND OF THE INVENTION

1. Field of the Invention

This invention relates to a damper device for a precision assembling robot capable of preventing a failure of assembly due to positioning errors resulting from residual vibrations, or nonconformities due to the impact of the robot against an object.

2. Description of the Prior Art

Conventionally, demands concerning the weight capacity and the motion area of a precision assembling robot have not been so severe and consequently, the length and weight capacity of the robot have not been required to be so large so that vibrations of the robot due to a lack of rigidity has not been taken up as a serious problem constituting a cause of defectiveness of assembly.

However, the kinds of work which can be performed using a robot have become so versatile of late that there has been a strong demand, even in the case of a precision assembling robot, that the robot should handle heavier objects in a wider operation area and at higher speeds.

Accordingly, a large-sized and high-speed operation robot meeting such demand has come to be developed. In the case of the above-mentioned large-sized and high-speed operation robot, it is extremely difficult to increase the rigidity of the robot arm and further, a lack of rigidity of the arm promotes vibrations on the robot to a remarkable degree. Consequently, a failure of assembly due to positioning errors arising from the residual vibrations of the robot arm or nonconformity due to impact of the arm against an object has become an important problem.

SUMMARY OF THE INVENTION

An object of the present invention is to provide a damper device for a precision assembling robot which minimizes a positioning error by dampening the residual vibrations of the robot arm.

The damper device comprises an integral assembly comprised of a rubber member and a metallic weight and is attached near the tip of the robot arm. The rubber member which forms part of the damper device has the function of dampening vibrations by absorbing the vibration energy since it is combined with the weight member. Therefore, by attaching such a damper device near the tip of the robot arm, it is possible to dampen the residual vibrations of the robot arm resulting from the dead load of the arm, terminal effector or the object, or a lack of rigidity of the arm or gears.

BRIEF DESCRIPTION OF THE DRAWINGS

FIGS. 2, 3 and 4 are sectional views of the damper devices used in several embodiments of the present invention;

DETAILED DESCRIPTION OF THE PREFERRED EMBODIMENTS

One embodiment of the present invention will now be described by referring to a horizontal multijoint type precision assembling robot shown in FIG. 1.

Figure 1:
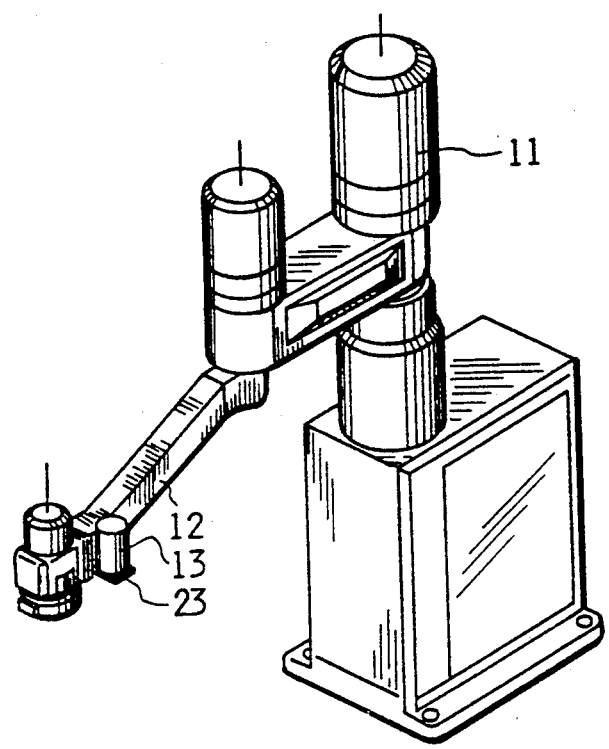
FIG. 1 is an external perspective view of a precision assembling robot provided with a vibration damper according to the present invention.

As shown in FIG. 1, the horizontal multijoint type precision assembling robot 11 is provided with a vibration damper device 13 near the tip of a second arm section 12 which can swing in the horizontal direction. The second arm section 12 is pivotally connected to a first arm section 10 to define the robot arm.

Figure 2:
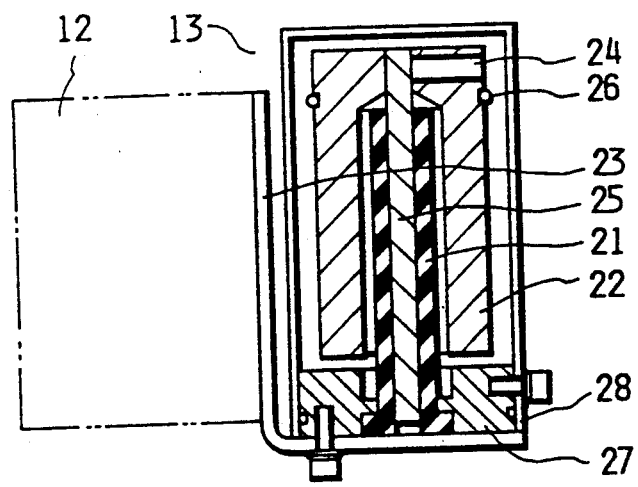

Referring to FIG. 2, which is a sectional view of the vibration damper device 13 of FIG. 1, the damper device 13 is bolted to the second arm section 12 through a bracket or fitting angle 23 with its axis held normal to the swinging direction of the second arm section 12. Further, within the damper device 13 there is arranged a columnar rubber pipe 21 into which a metallic shaft or rod 25 is inserted lengthwise. In addition, a metallic weight member 22 is fixed to the shaft 25 by means of a fastening screw 24. The rubber pipe 21 is engaged with a support member or fitting 27 which latter is fixed to the bracket or fitting angle 23. There is a suitable space between the fitting 27 and the metallic weight 22 so as to allow the weight member 2 to incline in response to horizontal vibrations thereby resiliently flexing the rubber pipe 21.

By such a construction, the second arm section 12 and the vibration damper device 13 are integral with each other and as a result, the rubber pipe member 21 and the metallic weight member 22 can move freely with respect to the robot thereby dampening the residual vibrations of the robot arm. When residual vibration of the robot arm occurs, the vibration is transmitted through the rubber member 21 to the weight member 22 which, due to its inertia, tends to vibrate out of phase with respect to the residual vibration. The vibration of the weight member 22 resiliently flexes the rubber member 21 and in this manner, the vibration energy of the robot arm is absorbed and dampened.

Further, a cover 28 is bolted to the support member or fitting 27. In this case, in order to prevent impact due to the collision of the cover 28 with the weight 22, an O-ring 26 made of rubber is attached to the weight 22.

FIG. 3 shows another embodiment of the present invention. In comparison with the embodiment of FIG. 2, it will be seen that in the case of this embodiment, the lower end of the rod or shaft 25 attached with the metallic weight 22 is located above a collar 27a of the fitting 27 for fixing the rubber pipe 21.

Accordingly, the weight 22 is able to have a large angle of inclination and so the antivibration effect of the weight can be increased much more as compared to that of the FIG. 2 embodiment. The length and position of the rod 25 thus determines the dampening factor of the damper device.

FIG. 4 shows still another embodiment of the present invention in which unlike the embodiments of FIGS. 2 and 3, the vibration damper device 13 is of a pendulum type and is fixed upside down. This system is also able to achieve the same antivibration effect.

It should be noted that although in the above embodiments the rod or metallic shaft 25 is inserted lengthwise into the rubber pipe 21 and the weight 22 is fixed to this shaft, the pipe 21 may be substituted with a solid columnar member made of rubber and the weight may be directly fixed to the solid rubber member.

Figure 5:
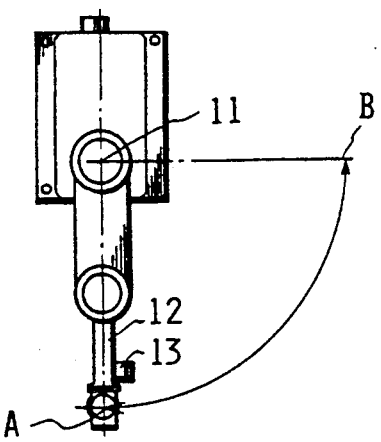
FIG. 5 is an explanatory view illustrating how the tangential acceleration of the tip of the arm of the robot is measured.
Figure 6:
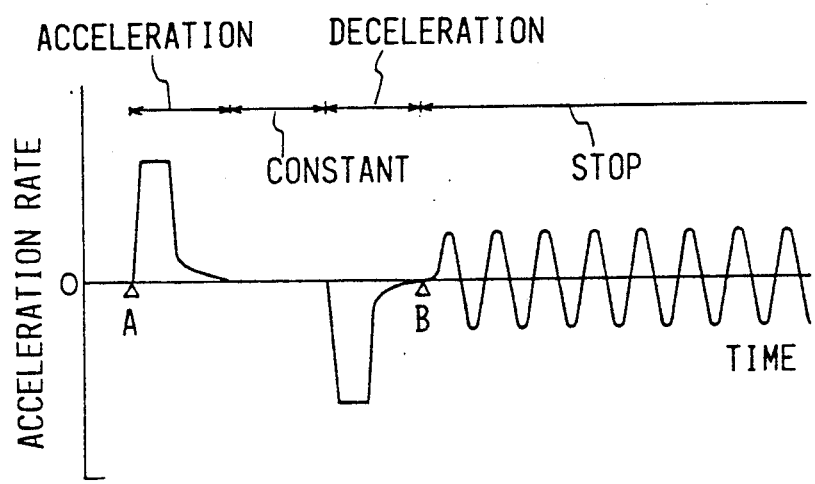
FIG. 6 and 7 are graphs showing curves indicative of the tangential accelerations of the tip of the arm of the robot, plotted against time on the bases of actual measured values, with the graph of FIG. 6 made with the use of a robot not provided with the vibration damper device of the present invention and that of FIG. 7 made with the use of the same robot provided with the damper device of the present invention.
Figure 7:
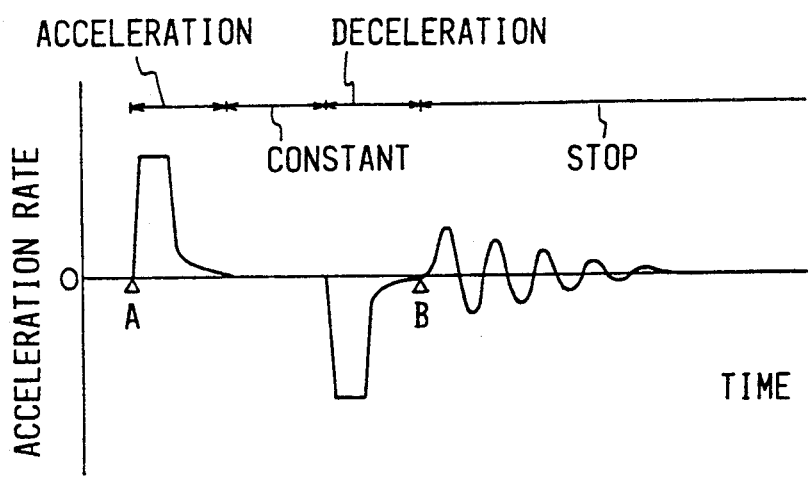

FIG. 5 shows the horizontal multijoint type precision assembling robot when viewed from above. Further, FIGS. 6 and 7 are graphs each showing a curve indicative of the relationship between the tangential acceleration of the tip of the robot arm and time as the arm is moved from Point A to Point B after the first and second arm sections 10,12 are brought into coaxial alignment. The graph of FIG. 6 was made by the use of the robot not provided with the vibration damper device while that of FIG. 7 was made by the use of the robot provided with the vibration damper device, and it will be seen from the above graphs that the residual vibrations of the robot arm are effectively converged and dampened when the vibration damper device is present and not converged and dampened when the damper device absent.

According to the present invention, it is possible to dampen the residual vibrations of the robot arm by the provision of a vibration damper device of simple structure so that a failure of assembly due to positioning errors arising from the residual vibrations or impact of the robot arm against the object can be reduced.

What is claimed is:

1. A damper device for dampening residual vibrations of a swingable robot arm, the damper device comprising: a support member attachable to a swingable robot arm; a columnar elastic member having one end thereof connected to the support member and extending outwardly of the support member; and a weight member connected to the columnar elastic member at a location remote from the support member, the weight member having a hollow interior portion defining an internal surface and the columnar elastic member extending through the hollow interior portion in spaced relation from the internal surface, and the weight member being spaced from the support member and having sufficient weight to effect resilient flexure of the columnar elastic member in response to residual vibration of the robot arm thereby enabling the columnar elastic member to absorb the vibration energy of the robot arm.

2. A damper device according to claim 1; including a rod inserted lengthwise into the columnar elastic member, the length of the rod determining the dampening factor of the damper device.

3. A damper device according to claim 2; wherein the end of the rod proximate the support member is axially spaced from the support member.

4. A damper device according to claim 2; wherein the end of the rod proximate the support member extends axially into the support member.

5. A damper device according to claim 2; wherein the rod is comprised of metal.

6. A damper device according to claim 5; wherein the columnar elastic member is comprised of rubber.

7. A damper device according to claim 2; including means connecting the end portion of the rod which is remote from the support member to the weight member.

8. A damper device according to claim 2; wherein the rod and the columnar elastic member are composed of materials having different rigidity characteristics.

9. In combination: a robot having a swingable robot arm swingable in a given plane during operation of the robot; a bracket connected to the distal end of the robot arm and having a bracket portion extending laterally of the robot arm; and a damper device connected to the bracket portion for dampening residual vibrations of the robot arm in the given plane, the damper device comprising a support member attached to the bracket portion, a columnar elastic member having one end thereof connected to the support member and extending outwardly of the support member, and a weight member connected to the columnar elastic member at a location remote from the support member, the weight member having a hollow interior portion defining an internal surface and the columnar elastic member extending through the hollow interior portion in spaced relation from the internal surface, and the weight member being spaced from the support member and having sufficient weight to effect resilient flexure of the columnar elastic member in response to residual vibration of the robot arm thereby enabling the columnar elastic member to absorb the vibration energy of the robot arm.

10. A combination according to claim 9; including a rod inserted lengthwise into the columnar elastic member, the length of the rod determining the dampening factor of the damper device.

11. A combination according to claim 10; wherein the end of the rod proximate the support member is axially spaced from the support member.

12. A combination according to claim 10; wherein the end of the rod proximate the support member extends axially into the support member.

13. A combination according to claim 10, including means connecting the end portion of the rod which is remote from the support member to the weight member.

14. A combination according to claim 10; wherein the rod and the columnar elastic member are composed of materials having different rigidity characteristics.

* * * * *